(12) United States Patent
Swanson

(10) Patent No.: US 8,360,219 B2
(45) Date of Patent: Jan. 29, 2013

(54) CLUTCH SYSTEM AND METHODS

(75) Inventor: Craig M. Swanson, Perham, MN (US)

(73) Assignee: Kit Masters, Inc., Perham, MN (US)

( * ) Notice: Subject to any disclaimer, the term of this patent is extended or adjusted under 35 U.S.C. 154(b) by 434 days.

(21) Appl. No.: 12/767,550

(22) Filed: Apr. 26, 2010

(65) Prior Publication Data

US 2011/0259699 A1    Oct. 27, 2011

(51) Int. Cl.
*F16D 13/30*    (2006.01)
*F01P 7/02*    (2006.01)

(52) U.S. Cl. ............... 192/66.22; 192/85.21; 192/85.37; 192/89.27; 192/114 R

(58) Field of Classification Search ............... 192/66.22, 192/85.21, 85.37
See application file for complete search history.

(56) References Cited

U.S. PATENT DOCUMENTS

| | | |
|---|---|---|
| 768,384 A | 8/1904 | Lockwood |
| 1,371,391 A | 3/1921 | Ollard |
| 1,827,348 A | 10/1931 | Bing |
| 2,172,311 A | 9/1939 | Thomas |
| 2,259,461 A | 10/1941 | Eason |
| 2,357,620 A | 9/1944 | Thomas |
| 2,369,328 A | 2/1945 | Watts |
| 2,614,396 A | 10/1952 | Ratermann |
| 2,637,308 A | 5/1953 | Dodge |
| 2,742,179 A | 4/1956 | Livers |
| 2,769,932 A | 11/1956 | Zozulin et al. |
| 2,865,481 A * | 12/1958 | De Teramala ............... 192/85.21 |
| 3,077,252 A | 2/1963 | Treer |
| 3,109,555 A | 11/1963 | Samans |
| 3,185,250 A | 5/1965 | Glazier |
| 3,202,252 A | 8/1965 | Schilling |
| 3,253,687 A | 5/1966 | Young |
| 3,409,305 A | 11/1968 | Nieland |
| 3,458,122 A | 7/1969 | Andriussi et al. |
| 3,467,071 A | 9/1969 | Elmer |
| 3,468,402 A | 9/1969 | Edwards |
| 3,517,683 A | 6/1970 | Chandler |
| 3,684,397 A | 8/1972 | Elmer |
| 3,762,517 A | 10/1973 | Hanks |
| 4,044,729 A | 8/1977 | Elmer |
| 4,132,301 A | 1/1979 | Zabonick |
| 4,199,048 A | 4/1980 | Ishikawa |
| 4,226,095 A | 10/1980 | Loken |
| 4,231,457 A | 11/1980 | Cornish |

(Continued)

FOREIGN PATENT DOCUMENTS

| | | |
|---|---|---|
| DE | 4121240 | 1/1993 |
| SU | 731918 | 5/1980 |

OTHER PUBLICATIONS

"Advantage Reman® Remanufactured Air-Engaged On/Off Fan Drives," Horton Product Catalogs, http://www.hortoninc.com/products/products.asp, printed from the internet on Dec. 27, 2005, 2 pages.

(Continued)

*Primary Examiner* — Rodney Bonck
(74) *Attorney, Agent, or Firm* — Oblon, Spivak, McClelland, Maier & Neustadt, L.L.P.

(57) ABSTRACT

Some embodiments of a clutch system or method include a fan clutch device having a clutch shut-off system permits a cooling fan to continue to provide airflow even when the friction ring is worn down to a level that requires replacement.

20 Claims, 5 Drawing Sheets

U.S. PATENT DOCUMENTS

| | | | |
|---|---|---|---|
| 4,352,365 | A | 10/1982 | Boccardo et al. |
| 4,355,710 | A | 10/1982 | Schilling |
| 4,408,685 | A | 10/1983 | Schilling et al. |
| 4,418,807 | A | 12/1983 | Raines |
| 4,423,803 | A | 1/1984 | Malloy |
| 4,425,993 | A | 1/1984 | Schilling |
| 4,450,947 | A | 5/1984 | Hanks |
| 4,456,110 | A | 6/1984 | Hanks et al. |
| 4,460,079 | A | 7/1984 | Hanks |
| 4,483,430 | A | 11/1984 | Carmichael et al. |
| 4,515,258 | A * | 5/1985 | Johnson ................... 192/85.21 |
| 4,541,516 | A | 9/1985 | Fenzel |
| 4,570,849 | A | 2/1986 | Klaucke et al. |
| 4,628,953 | A | 12/1986 | Correll et al. |
| 4,657,126 | A | 4/1987 | Hanks et al. |
| 4,750,595 | A | 6/1988 | Dayen et al. |
| 4,766,986 | A | 8/1988 | Dayen et al. |
| 4,770,281 | A | 9/1988 | Hanks |
| 4,826,064 | A | 5/1989 | Dayen et al. |
| 4,830,161 | A | 5/1989 | Hall et al. |
| 4,846,315 | A | 7/1989 | Dayen |
| 4,872,535 | A | 10/1989 | Dayen et al. |
| 4,877,117 | A | 10/1989 | Kniebel et al. |
| 4,909,367 | A | 3/1990 | Elmer |
| 4,934,500 | A | 6/1990 | Hanks et al. |
| 5,059,161 | A | 10/1991 | Bredt |
| 5,215,175 | A | 6/1993 | Fenzel |
| 5,242,036 | A | 9/1993 | Hennessy et al. |
| 5,355,983 | A | 10/1994 | Radomski et al. |
| 5,398,794 | A | 3/1995 | Walberg et al. |
| 5,427,609 | A | 6/1995 | Zoglman et al. |
| 5,586,635 | A | 12/1996 | Nelson et al. |
| 5,611,415 | A | 3/1997 | Davis et al. |
| 5,613,586 | A | 3/1997 | Schilling et al. |
| 5,624,016 | A | 4/1997 | Coulter et al. |
| 5,636,719 | A | 6/1997 | Davis et al. |
| 5,667,045 | A | 9/1997 | Cummings, III |
| 5,704,461 | A | 1/1998 | Vatsaas et al. |
| 5,752,810 | A | 5/1998 | Hein |
| 5,765,672 | A | 6/1998 | Briggs et al. |
| 5,877,117 | A | 3/1999 | Anderson et al. |
| 5,878,858 | A | 3/1999 | Hein |
| 5,896,971 | A | 4/1999 | Hein |
| 5,897,107 | A | 4/1999 | Zierden et al. |
| 5,911,295 | A | 6/1999 | Itonaga et al. |
| 5,913,396 | A | 6/1999 | Hein |
| 5,984,070 | A | 11/1999 | Briggs et al. |
| 6,013,003 | A | 1/2000 | Boffelli et al. |
| 6,092,638 | A | 7/2000 | Vatsaas |
| 6,109,871 | A | 8/2000 | Nelson et al. |
| 6,135,029 | A | 10/2000 | Oberjohn |
| 6,253,716 | B1 | 7/2001 | Palmer et al. |
| 6,273,221 | B1 | 8/2001 | Schmidt |
| 6,507,790 | B1 | 1/2003 | Radomski |
| 6,548,929 | B2 | 4/2003 | Nelson et al. |
| 6,600,249 | B2 | 7/2003 | Nelson et al. |
| D478,093 | S | 8/2003 | Bentley |
| 6,811,011 | B2 | 11/2004 | Bastien |
| 6,838,796 | B1 | 1/2005 | Nelson |
| 7,104,382 | B2 | 9/2006 | Swanson et al. |
| 7,201,267 | B2 | 4/2007 | Swanson et al. |
| 7,311,189 | B2 | 12/2007 | Swanson et al. |
| 7,438,169 | B2 | 10/2008 | Swanson et al. |
| 7,604,106 | B2 | 10/2009 | Swanson et al. |
| 2002/0014804 | A1 | 2/2002 | Nelson et al. |
| 2002/0021973 | A1 | 2/2002 | Nelson |
| 2002/0046915 | A1 | 4/2002 | Inoue et al. |
| 2006/0076210 | A1 | 4/2006 | Settineri |
| 2006/0151278 | A1 | 7/2006 | Settineri |
| 2007/0137974 | A1 | 6/2007 | Swanson et al. |
| 2008/0029362 | A1 | 2/2008 | Swanson |

OTHER PUBLICATIONS

"Bendix® FD-1™ Clutch Type Fan Drive," Bendix Service Data SD-09-8501, 8 pages, Apr. 2004.
"Bendix® FD-2™ Clutch Type Fan Drive," Bendix Service Data SD-09-8503, 8 pages, Apr. 2004.
"Bendix® FD-3™ TorqueMaster Fan Clutch," Bendix Service Data SD-09-8504, 8 pages, Apr. 2004.
"Bendix® FD-L™ Fan Clutch," Bendix Service Data SD-09-8505, 8 pages, Apr. 2004.
"Drive Master® PolarExtreme Spring-Engaged Fan Drives," Horton Product Catalogs, http://www.hortoninc.com/products/products.asp, printed from the internet on Oct. 27, 2005, 2 pages.
"Drive Master® Reman Spring-Engaged Fan Drives," Horton Product Catalogs, http://www.hortoninc.com/products/products.asp, printed from the internet on Oct. 27, 2005, 2 pages.
"Drive Master® Spring-Engaged Fan Drives," Horton Product Catalogs, http://www.hortoninc.com/products/products.asp, printed from the internet on Oct. 27, 2005, 2 pages.
"Drive Master® Two-Speed Fan Drives," Horton Product Catalogs, http://www.hortoninc.com/products/products.asp, printed from the internet on Oct. 27, 2005, 2 pages.
"Engine Cooling Fans. Fan Spacers & Adapters," Horton, Inc., pp. 47-48, Jun. 2002.
"FAIL SAFE™ On/Off K22FA Front Air Fan Clutch Service Guide," Quik-Kool™ Cooling System Components, 2 pages, Jun. 2002.
"FAIL SAFE™ On/Off K22RA Rear Air Clutch Series, 1090-08500" Quik-Kool™ Cooling System Components, 8 pages, Jun. 2002.
"FAIL SAFE™ On/Off K22RA Rear Air Fan Clutch Service Guide," Quik-Kool™ Cooling System Components, 2 pages, Jun. 2002.
"FAIL SAFE™ On/Off K22RA/K22FA Front Air/Rear Air Lining Replacement," Quik-Kool™ Cooling System Components, 2 pages, Jun. 2002.
"FAIL SAFE™ On/Off K22RA/K26RA Fan Hub Series 1077," Quik-Kool™ Cooling System Components, 4 pages, Jun. 2002.
"FAIL SAFE™ On/Off K22RA/K26RA Rear Air Fan Clutch Replacement," Quik-Kool™ Cooling System Components, 2 pages, Jun. 2002.
"FAIL SAFE™ On/Off K26RA Rear Air Fan Clutch Series 1090-09500," Quik-Kool™ Cooling System Components, 8 pages, Jun. 2002.
"FAIL SAFE™ On/Off K26RA Rear Air Lining Replacement," Quik-KooL™ Cooling System Components, 2 pages, Jun. 2002.
"Fan Clutch Overhaul Instructions," Kit Masters, Ramsey, MN, 7 pages, date unknown.
"HT/S Advantage™ Air-Engaged Fan Drives," Horton Product Catalogs, http://www.hortoninc.com/products/products.asp, printed from the internet on Oct. 27, 2005, 2 pages.
"Installation and Service Guide—Kysor Front Air Fan Drives," Kysor Cooling Systems N.A., 24 pages, Oct. 1998.
"K-22RA Fan Drive," Kysor Cadillac, 20 pages, Jul. 1996.
"Klondike® Series Replacement Fan Clutch for Kysor's K22RA," Horton, Inc., 2 pages, 2004.
"Klondike® Series Replacement Fan Clutches for K22RA Kits for Kysor's K22RA and K22FA," Horton Product Catalogs, http://www.hortoninc.com/products/products.asp, printed from the internet on Oct. 27, 2005, 3 pages.
"Kysor On/Off Diagnostic Guide," BorgWarner, http://www.ets.borgwarner.com, 2 pages, Jun. 2002.
"PolarExtreme HT/S Reman Fan Drives," Horton Product Catalogs, http://www.hortoninc.com/products/products.asp, printed from the internet on Oct. 27, 2005, 2 pages.
"The Kysor K-22RA Fail Safe™ On-Off Fan Clutch," BorgWarner Cooling Systems, Apr. 2000, 2 pages.
"Welcome to Kitmasters," [online]. Kit Masters, 2004, [retrieved on Dec. 14, 2000]. Retrieved from the Internet: <URL: www.kit-masters.com>, 7 pages.
Bendix Catalog Index, 20 pages, date unknown.
BorgWarner 2004 Product Catalog, front and back covers and pp. 92-256 and 341-389.
Horton Catalog, Mar. 1998, 71 pages.
Horton Heavy-Duty Vehicle Components Catalog, Jul. 2004, front and back covers and Table of Contents, pp. I-V.
Shigley et al., Power Transmission Elements—A Mechanical Designers' Workbook, (New York, McGraw-Hill, 1990) pp. 76, 91-95, TJ1045.P681990 NFOA Jan. 2, 2008.
Letter from Alan M. Koenck, dated Sep. 24, 2008, 2 pages.

Horton Price Quotation, 1 page, date not available to applicant.

Drawings of Horton, Inc., Part No. 984145, 2 pages, date unavailable to applicant.

Drawings of Horton, Inc., Part No. 984149, 2 pages, date unavailable to applicant.

Drawings of Horton, Inc., Part No. 984152, 2 pages, date unavailable to applicant.

Horton, Inc., "Rear Air Drivemaster," 2001, 33 pages.

* cited by examiner

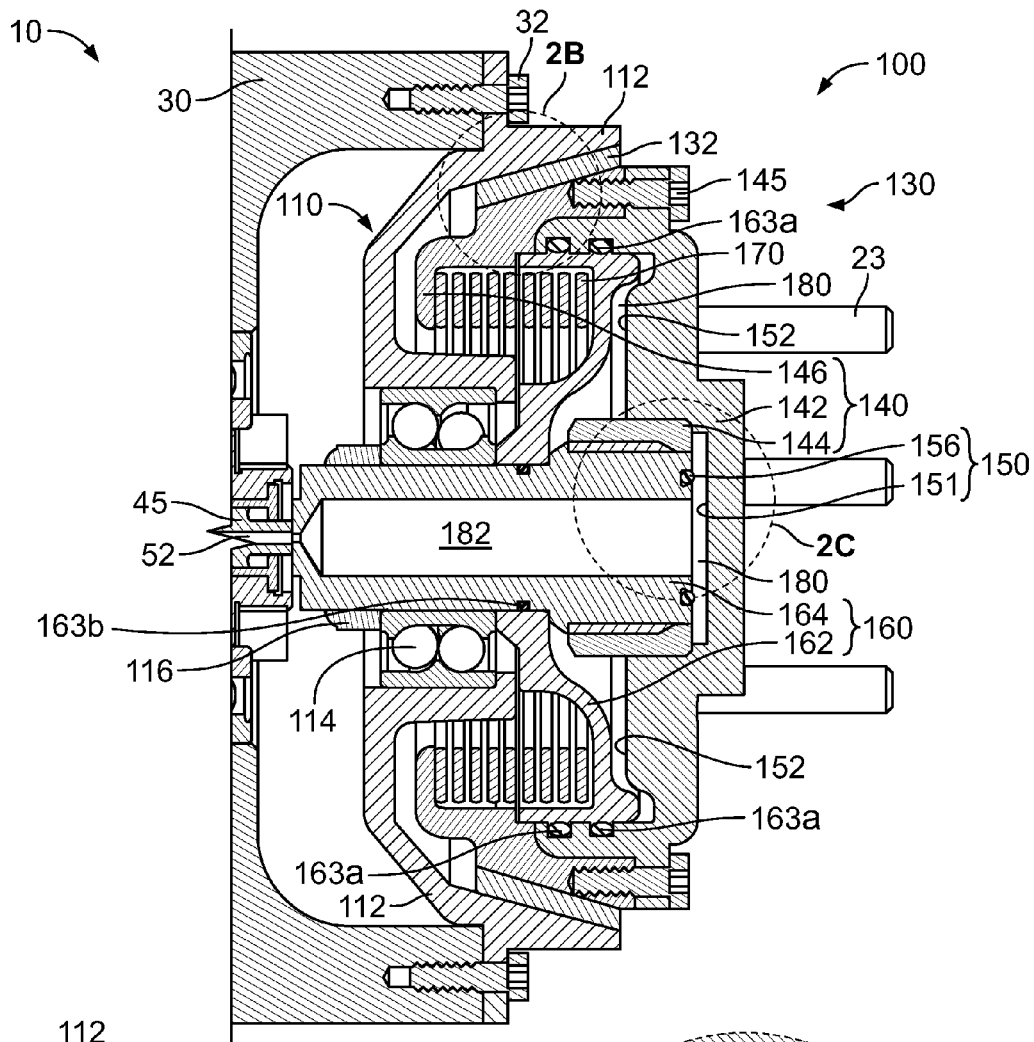
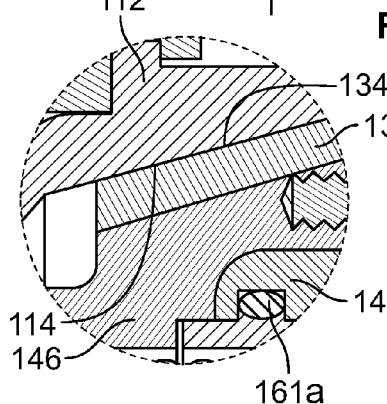
FIG. 2B
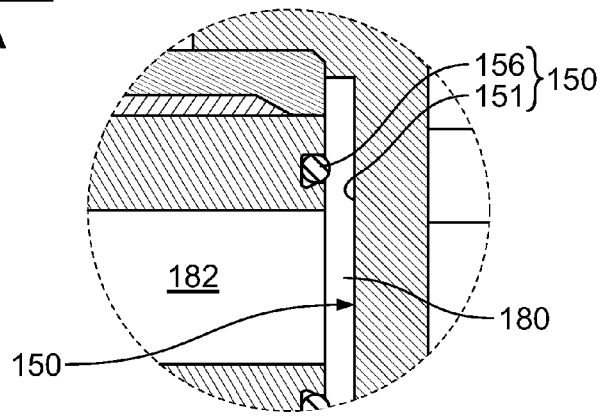
FIG. 2C

CLUTCH SYSTEM AND METHODS

TECHNICAL FIELD

This document relates to a rotational control apparatus, such as a clutch apparatus to control the rotation of a fan device in a vehicle.

BACKGROUND

Vehicle transmission systems, cooling systems, and braking systems may employ clutches or like devices to selectively transmit rotational forces from a drive source to an output member. For example, some cooling systems employ fan clutches that control the output rotation of engine cooling fans. Such a fan clutch can be driven by a drive pulley that rotates in response to the vehicle engine.

In general, the clutch can be operated to engage (or disengage) opposing clutch surfaces, which rotationally interconnect (or rotationally disconnect) the drive pulley and the output member. In an example related to fan clutches, when the clutch is shifted to the engaged position, friction surfaces engage and the output member (carrying fan blades) is driven to rotate along with the drive pulley. Over time, the friction surface can become worn, requiring replacement.

In some cases, the fan clutch in a vehicle can become inoperable due to wearing of the friction surfaces. For example, in some conventional fan clutch devices, a friction clutch ring is unable to engage an opposing friction surface when the friction clutch ring is worn below a threshold thickness. Accordingly, the fan clutch device is unable to force engagement of the friction surfaces and the fan blades are not driven to rotate (e.g., no cooling airflow is provided). Due to the lack of cooling airflow, the vehicle's engine may overheat or otherwise become highly inefficient.

These conventional fan clutch devices are typically supplied with a set of "come home" bolts for separate storage by the vehicle operator (e.g., placement in the vehicle cabin for use at a much later time. Thus, after a period of years when the friction ring of the fan clutch device is worn down below a threshold level so that the friction surfaces are no longer able to engage, the vehicle operator must attempt to locate the "come home" bolts that were stored years earlier. If the "come home" bolts are located, the vehicle operator must then attempt to install the bolts to the fan clutch device in the engine compartment. In general, the "come home" bolts are installed onto the outer periphery of the clutch device so as to temporarily bolt the output member to the input member, thereby causing permanent rotation of the fan blades until the vehicle can be driven to a repair facility. For vehicles such as large semi trucks or buses, the installation of the "come home" bolts may occur on the side of the road if the fan clutch fails during a long journey.

SUMMARY

Some embodiments of a clutch system or method include a fan clutch device having a clutch shut-off system permits a cooling fan to continue to provide airflow even when the friction ring is worn down to a level that requires replacement. Moreover, the clutch shut-off system can automatically operate (e.g., without any user intervention or external controls) to prevent disengagement at the friction surfaces between the input portion and the output portion of the clutch device. For example, the fan clutch device can be equipped with an internal mechanical shut-off system that is self-activated, in response to the friction ring wearing down below a selected level, to prevent movement of the friction ring from the engaged position to the disengaged position.

Particular embodiments described herein include a fan clutch device to be removably mounted to a drive pulley. The fan clutch device may include an input portion that rotates with a drive pulley when the fan clutch device is mounted to the drive pulley. The device may also include an output portion for receiving a fan blade device and having a friction ring that reciprocates in an axial direction relative to the input portion between an engaged position and a disengaged position. When in the engaged position, the friction ring may frictionally engage with an opposing surface of the input portion to drive the output portion to rotate with the input portion. When in the disengaged position, the friction ring may be spaced apart from the opposing surface of the input portion. The device may further comprise a self-activating, clutch shut-off system that causes continuous friction engagement between the friction ring and the opposing surface of the input portion in response to the friction ring wearing down below a threshold thickness.

In some embodiments, a fan clutch system may include a drive pulley that rotates about a rotational axis, and a clutch device removably mounted to the drive pulley. The clutch device may include an input portion that rotates with a drive pulley. Also, the clutch device may include an output portion having a friction ring that reciprocates in an axial direction relative to the input portion between an engaged position in which the friction ring frictionally engages with an opposing surface of the input portion to drive the output portion to rotate with the input portion and a disengaged position in which the friction ring is spaced apart from the opposing surface of the input portion. The clutch device may further include an internal mechanical shut-off system that is housed in the output portion. The internal mechanical shut-off system may be automatically activated, in response to the friction ring wearing down below a selected level, to prevent movement of the friction ring from the engaged position to the disengaged position. The system may also include a fan blade device mounted to the output portion of the clutch device so as to rotate when the friction ring is in the engaged position.

A number of embodiments described herein include a method of operating a fan clutch device that is removably mounted to a drive pulley. The method may include rotating an input portion of a fan clutch device with a drive pulley. The method may also include reciprocating a friction ring of an output portion of the fan clutch device in an axial direction between an engaged position and a disengaged position. When the friction ring is in the engaged position, the friction ring frictionally may engage with an opposing surface of the input portion to drive the output portion to rotate with the input portion. When the friction ring is in the disengaged position, the friction ring may be spaced apart from the opposing surface of the input portion. The method may further include, in response to the friction ring wearing down below a threshold thickness, automatically shutting off the fan clutch device without user intervention while the friction ring is in the engaged position such that friction ring is hindered from moving to the disengaged position.

In one aspect, the step of automatically shutting off the fan clutch device may include causing an internal mechanical shut-off system to self-activate in response to the friction ring wearing down below the threshold thickness. The internal mechanical shut-off system may be housed within the output portion of the fan clutch device and may cause continuous friction engagement between the friction ring and the opposing surface of the input portion in response to the friction ring wearing down below the threshold thickness.

Some or all of the embodiments described herein may provide one or more of the following benefits. First, some embodiments of a clutch device can include clutch shut-off system that causes a cooling fan to provide continuous airflow even when a friction ring of the clutch device is worn down below a threshold thickness level and requires replacement. As such, the output portion of the clutch device (and the fan blade device attached thereto) will continuously rotate with the input portion of the clutch device even after the friction ring is worn down and needs replacement, thereby providing cooling airflow to the vehicle engine without the need for "come home" bolts or other user intervention on the clutch device. Because the clutch shut-off system causes the clutch device to default to a permanent engaged position when the friction ring incurs a predetermined amount of wear, the vehicle engine will not be subjected to a loss of cooling airflow during a journey and the vehicle operator will not be forced to intervene or service the clutch device (e.g., on the side of the road) before driving to a service station.

Second, some embodiments of the clutch shut-off system can operate as a self-activated mechanical system that, without any user intervention or external controls, forces the friction ring to remain in a frictionally engaged condition. In addition, the clutch shut-off system can be housed within the clutch device, such as within the output portion of the clutch device, without increasing the radial size of the clutch device.

Third, some embodiments of the clutch device can provide substantial torque transfer capabilities in a relatively compact assembly. For example, some embodiments of the clutch device may provide torque ratings in the range of approximately 3000 in-lbs to approximately 6000 in-lbs.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2A is a cross-sectional view of the system of FIG. 1, including the fan clutch device.

FIGS. 2B-2C are cross-sectional views of portions of the fan clutch device of FIG. 2A.

Like reference symbols in the various drawings indicate like elements.

DETAILED DESCRIPTION OF ILLUSTRATIVE EMBODIMENTS

Figure 3:
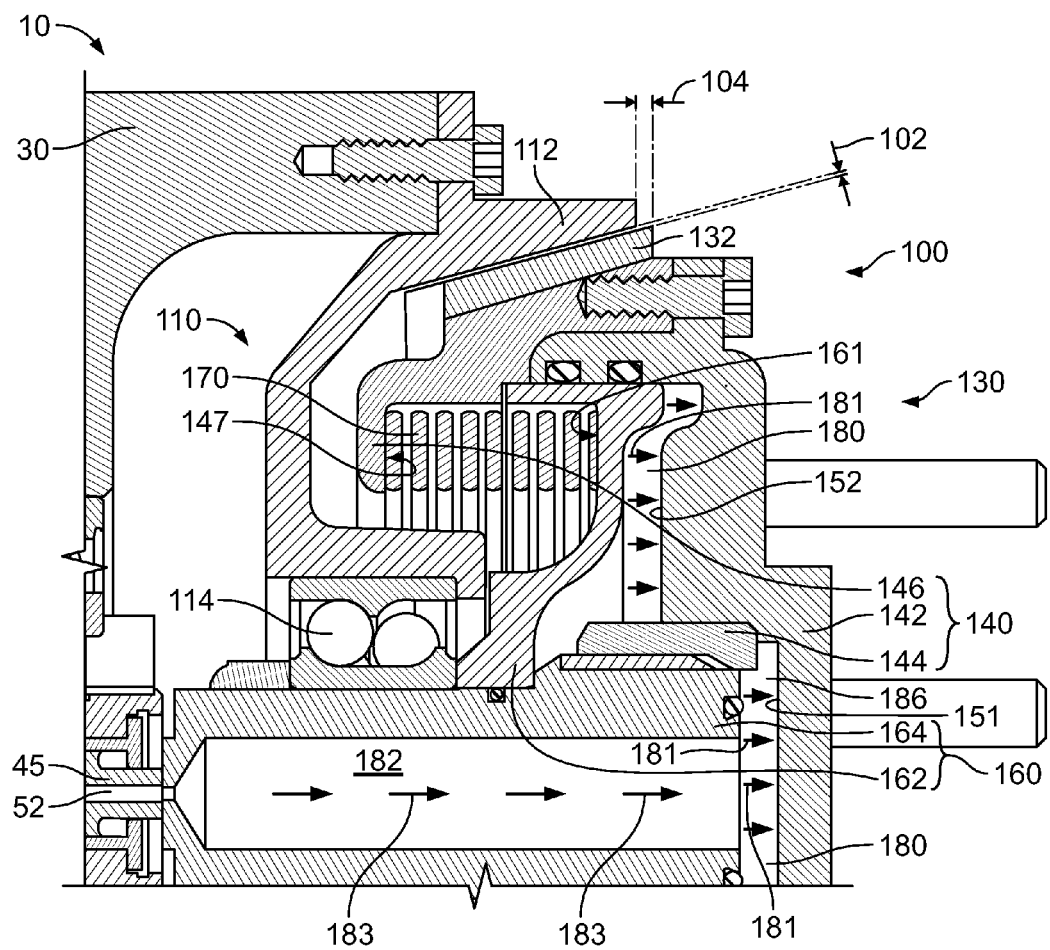
FIG. 3 is a cross-sectional view of the system of FIG. 2A, with an output portion shifted to a disengaged position.

Referring to FIGS. 1, 2A-2C, some embodiments of a clutch system 10 include a clutch device 100 that provides rotational output for a cooling fan device 20 having a number of fan blades. The clutch device 100 includes an input portion 110 and an output portion 130 adjustable between an engaged position (FIG. 2) and a disengaged position (FIG. 3). In this embodiment, the clutch device 100 can include opposing clutch surfaces 114 and 134 configured such that, when the clutch device 100 is in an engaged position, the rotational motion of the input portion 110 (as driven by a drive member 30 shown in FIG. 1) can be transmitted via the frictional interface between the opposing clutch surfaces 114 and 134 so that the output portion 130 and the fan blade device 20 mounted thereto are driven at a first speed.

After extended use of the clutch device 100 (e.g., while the clutch device 100 is transitioned between the engaged and disengaged positions, and the like), the friction material can be worn from one or both of the clutch surfaces 114 and 134. For example, the friction material of a friction ring 132 that defines the clutch surface 134 may reduce in thickness after an extended period of use due to the repeated frictional engagements between the opposing surfaces 114 and 134. In this embodiment, the clutch surface 114 is a frusto-conical clutch surface that extends along an inner surface of an input ring 112 and the corresponding clutch surface 134 is a frusto-conical clutch surface located on the outer surface of a replaceable friction ring 132. The input ring 112 and the friction ring 132 may comprise a metallic, ceramic, or other material that is capable of providing frictional engagement and is capable of dissipating heat generated at the frictional interface. In some embodiments, the replaceable friction ring 132 comprises a friction material such that as the clutch device 100 is used, the friction ring 132 can wear at a greater rate than the input ring 112.

As described in more detail below, the clutch device 100 can include clutch shut-off system 150 that permits the fan blade device 20 to continue to provide airflow even when the friction ring 132 is worn down below a threshold level that requires replacement. In these embodiments, the clutch shut-off system 150 can be self-activated, without any user intervention or external controls, to prevent disengagement at the friction surfaces 114 and 134 between the input portion 110 and the output portion 130 of the clutch device 100. For example, as described in more detail below in connection with FIGS. 4A-4C, the clutch shut-off system may operate as an internal mechanical shut-off system that is automatically activated, in response to the friction ring 132 wearing down below a selected level, to prevent movement of the friction ring 132 from the engaged position to the disengaged position. As such, the output portion 130 (and the fan blade device 20 attached thereto) will continuously rotate with the input portion 110 of the clutch device 100 even after the friction ring 132 is reduced to a thickness that requires ring replacement, thereby providing cooling airflow to the vehicle engine without the need for "come home" bolts or other user intervention on the clutch device 100.

Thus, when the shut-off system 150 is activated (described in more detail below), the fan blade device 20 would continuously rotate with the drive pulley 30, thereby providing cooling airflow at all times and indicating to a vehicle operator that the clutch device 100 may require inspection and subsequent replacement of the friction ring 132. Since the clutch device 100 defaults to a permanent engaged position when the friction ring 132 incurs a predetermined amount of wear, the vehicle engine will not be subjected to a loss of cooling airflow during a journey and the vehicle operator will not be forced to intervene or service the clutch device 100 (e.g., on the side of the road) before driving to a service station. Furthermore, regular visual inspection of the friction surfaces 114 and 134 may be reduced or unnecessary, thus saving the vehicle operator money and reducing the amount of downtime of the vehicle.

Figure 1:
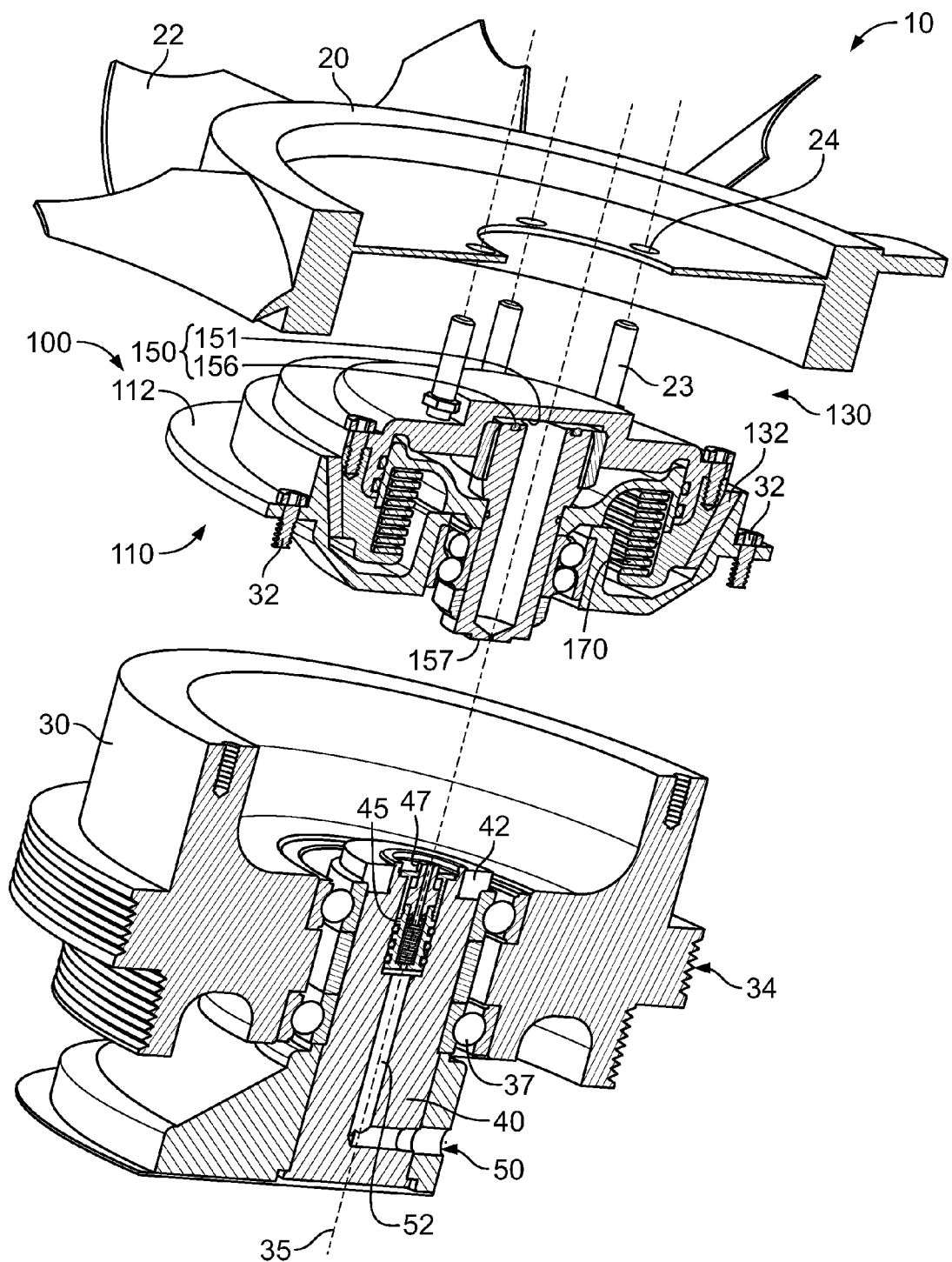
FIG. 1 is a perspective exploded view of a system including a fan clutch device, in accordance with some embodiments.

Briefly, in operation, the clutch system 10 may include a drive member 30 (e.g., a drive pulley as shown in FIG. 1, a drive shaft, or the like) that is rotated at a first speed due to connection with an engine output shaft via a belt, chain, gear, or the like. In some embodiments, the clutch system 10 includes the input portion 110 that can be directly or indirectly mounted to the drive pulley 30 so as to rotate at the first speed with the drive pulley 30. In the depicted embodiments, the input portion 110 includes the input ring 112 that is directly mounted to the drive pulley 30 via mounting bolts 32. The clutch system 10 also includes the output portion 130 having at least one component that can be actuated to engage or disengage with the input portion 110. For example, the output portion 130 can include a piston 140 that reciprocates axially relative to a hub 160 (which remains axially stationary relative to the input portion 110) so as to shift the friction ring 132 into engagement (FIG. 2A) or disengagement (FIG. 3, refer to a disengagement gap 102) with the opposing clutch ring 112 of the input portion 110. When the output portion 130 is adjusted to shift the friction ring 132 to the engaged position (FIG. 2A), the output portion 130 is urged to rotate at the first speed with the input portion 110 and the drive pulley 30. Note that the distance of the shift and the length of the disengagement gap 102 are exaggerated in the figures for purposes of illustration.

Still referring to FIGS. 1, 2A-2C, in some embodiments, the clutch device 100 can include features (e.g., a coil spring 170, a plurality of springs, or another biasing device) to bias the friction ring 132 to the engaged position and features (e.g., a fluid-receiving chamber 180 that can be filled with a pressurized fluid) to urge the friction ring 132 to the disengaged position. For example, when the clutch device 100 is engaged, the spring 170 can urge the piston 140 to move in an axially rearward direction toward the pulley 30, thereby causing the friction ring 132 to frictionally engage the opposing ring 112 at the interface of surfaces 114 and 134. Such frictional engagement of the clutch ring 112 causes the fan blade device 20 (connected to the output portion 130) to rotate at substantially the speed of the drive pulley 30.

In some embodiments, rotation of the fan blade device 20 can generate a flow of cooling air directed in an axial direction. For example, when the clutch device 100 drives the output portion 130 and the fan blade device 20 to rotate, the fan blades can create a cooling airflow directed generally axially toward the drive pulley 30 (FIG. 2A) and a vehicle engine radiator or cooling system.

Referring now to FIGS. 1 and 2A, in some embodiments the drive pulley 30 is rotatably coupled to a support shaft 40 by one or more bearings 37. A nut or collar device 42 is secured to the support shaft 40 and is abutted to the bearing 37 so that the bearings 37 remain substantially fixed in the axial direction relative to the support shaft 40. The drive pulley 30 receives a belt, chain, gear or the like in order to force the drive pulley 30 to rotate in a particular direction about an axis 35. In this embodiment, the support shaft 40 is substantially stationary, and the drive pulley 30 includes a belt engagement surface 34. Rotational power from a vehicle motor or the like may be transmitted through a belt (not shown) to the belt engagement surface 34, thereby urging the drive pulley 30 to rotate about the central axis 35 of the support shaft 40.

A fluid supply input channel 50 extends into the support shaft 40 for connection to a fluid supply reservoir (not shown). A supply channel 52 extends from the fluid supply input 50, a portion of which extends in a substantially axial direction along the central axis 35. In this embodiment, the supply channel 52 extends through a cylindrical outlet 45, which has a mating end 47 to mate with a face seal 157 of the clutch device 100. As such, when the clutch device 100 is mounted to the drive pulley 30, the face seal 157 is pressed against the mating end 47 to form a mechanical seal. A fluid channel 182 extending axially through the face seal 157 is substantially axially aligned with the central axis 35. Accordingly, the pressurized fluid may be transmitted from the fluid supply input 50, through the supply channel 52 and the fluid channel 182, and into the fluid-receiving chamber 180 of the clutch system 10. In some embodiments, the mating end 47, the face seal 157, or both may comprise metals, polymers, or composite materials that can substantially maintain the mechanical seal therebetween while the clutch system 10 is selectively rotated relative to the support shaft 40. The fluid transmitted to the fluid-receiving chamber 180 of the clutch system 10 may be any suitable liquid or gas, as described in more detail below. Such fluids may be received, for example, from a pneumatic air supply system or a hydraulic oil supply system.

In some embodiments, the output portion 130 of the clutch system 10 includes the piston 140 and the hub 160. The piston 140 includes a mounting plate 142, a first spline member 144, and a spring-engaging member 146, that are assembled together. Likewise, the hub 160 includes a spring-engaging plate 162 and a second spline member 164 that are assembled together. The piston 140 is movable in an axial direction relative to the hub 160 and is substantially stationary in a rotation direction relative to the hub 160. As such, the piston 140 can move axially relative to the hub 160, but rotates at generally the same speed as the hub 160. In this embodiment, the motion of the piston 140 relative to the hub 160 is accomplished by way of a spline connection between the first spline member 144 and the second spline member 164. In other embodiments, the motion of the piston 140 relative to the hub 160 may be accomplished using one or more bushings that permit relative axial movement and anti-rotation dowels that substantially prevent relative rotation between the piston 140 and the hub 160.

In some embodiments, the mounting plate 142 of the piston 140 is configured to receive an output instrument (e.g., a fan blade device 20 depicted in FIG. 1 or another instrument to be selectively rotated). In particular, the mounting plate 142 may include studs 23 that are configured to receive the output instrument. As shown in FIG. 1, the fan blade device 20 can be configured to fit over the output portion 130. The fan blade device 20 can include a plurality of fan blade structures 22 that are arranged to generate air flow (e.g., as part of a vehicle's engine cooling system). The fan blade structures 22 can be angled, tapered, curved, or otherwise configured to direct the output of air flow. In this embodiment, the fan blade device 20 includes mounting holes 24 that are configured to receive the studs 23 extending from the clutch system 10. In alternative embodiments, the output portion 130 of the clutch system 10 may be configured to receive an output instrument other than a fan blade device 20. For example, the mounting plate 142 may be configured to connect with other components that are to be selectively rotated, such as output shafts, gears, brake systems, and the like.

Referring now to FIGS. 2A-2C, as previously described, the mounting plate 142 can be assembled together with the first spline member 144 and the spring-engaging member 146 to form the piston 140. The mounting plate 142 of the piston 140 partially defines the fluid-receiving chamber 180 and has surfaces 151, 152 that are acted upon by the pressurized fluid in the fluid-receiving chamber 180 so as to overcome the spring bias of the spring device 170. The mounting plate 142 is fixedly coupled to the spring-engaging member 146, for example, by bolts 145 fastened into threaded cavities and slidably coupled to the spring engaging member 146. The first spline member 144 is fixedly coupled to the mounting plate 142, for example, by threads on an external surface of the first spline member 144 that are mated into a threaded cavity of the mounting plate 142. Accordingly, the piston components 142, 144, and 146 can collectively move relative to the hub 160 (e.g., shift axial positions relative to the hub 160 in this embodiment).

Referring again to FIGS. 1 and 2A, the hub 160 includes the second spline member 164 assembled together with the spring-engaging plate 162. The second spline member 164 can be fixedly coupled to the spring-engaging plate 162, for example, by threads on an external surface of the second spline member 164 that are mated into a threaded cavity of the spring-engaging plate 162. The second spline member 164 at least partially defines the fluid channel 182 extending from the face seal 157 to the chamber 180. At least one bearing 114 is disposed between the hub 160 (e.g., the second spline member 164) and the input ring 112. As previously described, the input ring 112 is secured to the drive pulley 30 and rotates along with the drive pulley 30. As such, the bearings 114 permit the hub 160 (including the second spline member 164 and the spring-engaging plate 162) to rotate relative of the input ring 112 and the drive pulley 30. In this embodiment, the bearings 114 are disposed along an outer circumferential surface 165 of the second spline member 164. The bearing 114 may be secured to the second spline member 164 and the input ring 112 using any number of securing means, such as collar devices, locking nuts, locking rings, tongue and groove arrangements, or the like. In this embodiment, the bearings 114 are secured to the hub 160 using a locking nut 116 so that the bearings 114 remain substantially stationary relative to the hub 160 in the axial direction. The bearings 114 are secured to the input ring 112 using a locking ring such that the bearings 114 remain substantially stationary relative to the input ring 112 in the axial direction. Therefore, in this embodiment, the hub 160 may rotate independently of the input ring 112 and drive pulley 30, but the hub 160 remains substantially stationary in the axial direction relative to the input ring 112 and drive pulley 30.

In some embodiments, the spring 170 is arranged between the piston 140 and the hub 160 so as to bias the piston 140 toward one of a first position and second position relative to the hub. In these embodiments, the spring 170 is a single, coiled spring that has an inner and outer diameter to fit securely between the spring-engaging plate 146 of the piston 140 and the spring-engaging plate 162 of the hub 160. The spring 170 may be arranged coaxial with the central axis 35 of the clutch device 100. Using only a single spring may simplify assembly and disassembly of the clutch system 10 during manufacture or repair. Because only one spring 170 need be arranged between plates 146 and 162, less time is required to properly align the spring 170 during assembly. Alternatively, other embodiments may use a more complex arrangement having a greater number of smaller springs that are positioned adjacent one another between plates 142 and 162.

Referring now to FIGS. 2A-2C and 3, when the clutch device 100 is assembled, the spring 170 is compressed between a spring-engaging surface 147 of the piston 140 and the spring engaging surface 161 of the hub 160. Such an arrangement urges the piston 140 in an axial direction toward the drive pulley 30. Thus, in this embodiment, the spring force applied by the spring 170 biases the piston 140 such that the engagement surface 134 of the friction ring 132 is urged against the opposing engagement surface 114 of the input ring 112, which is mounted to the drive pulley 30 using the bolts 32. Thus, as shown in FIG. 2, the friction ring 132 is biased by the spring device 170 to the engaged position. In particular, the friction ring 132 is mounted to the mounting plate 142 so that the engagement surface 134 of the friction ring 132 is adjacent to the engagement surface 114 of the input ring 112. When the engagement surface 114 presses against the opposing surface 134, the output portion 130 frictionally engages the input portion 110, which is mounted to the drive pulley 30, and the output portion 130 thereby rotates at the first speed with the drive pulley 30.

In some embodiments, the input ring 112 may comprise a metallic, ceramic, or other material that is capable of providing frictional engagement and is capable of dissipating heat generated at the frictional interface. For example, some embodiments of the input ring 112 may comprise a material having a static coefficient of friction in the range of approximately 0.2 to approximately 0.6 and, in particular embodiments may comprise a material having a static coefficient of friction in the range of approximately 0.4 to approximately 0.5. The input ring 112 can be arranged such that a portion is radially outward of the output portion 130 such that the input ring 112 can be secured to the pulley 30. In some embodiments, the input ring 112 may include the frusto-conical engagement surface 114, on the inner edge of the input ring 112, which at least partially extends in a non-radial direction. In such circumstances, the inner surface of the input ring 112 may have an increasingly larger outer diameter as the engagement surface 114 extends away from the drive pulley 30. Furthermore, in this embodiment, the engagement surface 114 and the outer conical surface of the spring-engaging member 146 may be generally parallel to one another so that the friction ring 132 has a generally uniform wall thickness. Thus, the radii of both the spring-engaging member 146 and the inner conical surface of the input ring 112 may become increasingly larger as the input ring 112 extends away from the drive pulley 30.

In some embodiments, the friction ring 132 is secured to the spring-engaging member 146, which rotates with the output portion 130, and the friction ring 132 can be arranged radially inward of the opposing engagement surface 114 of the input ring 112 that rotates with the input portion 110. Thus, the friction ring 132 may be positioned radially outward of the output portion 130 and radially inward of the engagement surface 114. The shape and orientation of the frusto-conical friction ring 132 and the complementary engagement surface 114 may provide the clutch system 10 with a conical wedging action. For example, when the clutch device 100 is in the engaged configuration (refer to FIG. 2A), the input ring 112 and opposing friction ring 132 may abut each other forming a frusto-conical frictional interface between the clutch surfaces (e.g., the engagement surface 114 and the opposing surface 134). This conical wedging action may improve the engagement friction, thereby providing an increase in the torque transfer capabilities. For example, some embodiments of the clutch device 100 (in which the friction ring 132 has a maximum outer radius of less than 12 inches, less than 10 inches, about 4 inches to about 8 inches, and preferably about 6.4 inches) may provide torque ratings of approximately 2700 in-lbs, 2800 in-lbs, 2900 in-lbs, 3000 in-lbs, or more, and particular embodiments may provide torque ratings in the range of approximately 3000 in-lbs to approximately 6000 in-lbs. The substantial torque transfer capabilities may be caused by a number of factors, such as the coefficient of friction of the input ring 112, the conical angle of the input ring 112, the spring force applied by the spring 170, and other factors that affect the torque rating of the clutch system 10.

Referring more closely to FIG. 3, the output portion 130 of the clutch system 10 may disengage the input portion 110 when fluid is introduced into the chamber 180 under sufficient pressure to axially shift the piston 140 relative to the hub 160. When the piston 140 shifts axially (e.g., an axial displacement distance 104), the engagement surface 134 is shifted away from the opposing surface 114 (e.g., yielding the disengagement gap 102). In this position, the output portion 130 (including the piston 140 and hub 160 in this embodiment) is no longer driven to rotate at the first speed due to the direct friction engagement with the input portion 110. As previously described, fluid may enter the chamber 180 through the fluid channel 182, for example as represented by the arrows 183. In this embodiment, the fluid-receiving chamber 180 is at least partially defined by the space between the mounting plate 142 of the piston 140 and the spring-engaging plate 162 of the hub 160. Fluid pressure within the chamber 180 creates a force against the piston 140 (e.g., at the surfaces 151, 152 of the mounting plate 142 as represented by arrows 181) in opposition to the force bias of the spring 170. When a sufficient amount of fluid pressure has built up in the chamber 180, the force imparted by the fluid on the piston 140 is enough to overcome the bias of the spring 170, forcing the piston 140 in an axial direction away from the drive pulley 30.

As shown in FIG. 3, when the friction ring 132 of the output portion 130 is shifted away from the input ring 112 of the input portion 110, the gap 102 is created between the engagement surface 114 of the input ring 112 and the friction surface 134 of the opposing friction ring 132. It should be understood that the displacement distance 104 of the piston 140 and the length of the gap 102 depicted in FIG. 3 may be exaggerated in the drawings for purposes of illustration. The gap 102 can be sufficient to eliminate contact between the input ring 112 and the opposing friction ring 132. In such circumstances, the output portion 130 (including the piston 140 and hub 160 in this embodiment) is no longer driven to rotate by direct engagement with the input portion 110. When the piston 140 is shifted to the disengaged position depicted in FIG. 3, the output portion 130 (including the piston 140 and hub 160 in this embodiment) can rotate relative to the input portion 110 and drive pulley 30 due to the bearing connection 114. Accordingly, the output portion 130 may rotate at a second, slower speed (e.g., a zero speed in some circumstances) even though the drive pulley 30 continues to rotate at the first speed.

As previously described, the gap 102 between the engagement surface 114 and the opposing friction surface 134 is created when a fluid under sufficient pressure is received in the chamber 180. If force from the fluid pressure in the chamber 180 is sufficient to overcome the force of the bias of the spring 170, the piston 140 is shifted in the axial direction away from the drive pulley 30. In some embodiments, the fluid pressure in the chamber 180 that is required to overcome the spring force may be approximately predetermined from the spring constant, the desired gap 102, the combined surface area of the surfaces 151 and 152 accessible to the fluid, and other such factors. As previously described, the fluid supply input 50 (see FIG. 1) receives the fluid from the reservoir (not shown). The fluid passes through the fluid supply channel 52, through the face seals 47 and 157, through the fluid channel 182, and into the chamber 180.

Still referring to FIG. 3, the fluid in the chamber 180 may have a single possible leak path at the outer periphery between the mounting plate 142 and the spring engaging plate 162. This leak path can be sealed using one or more ring seals 163a that are disposed along the outer periphery of the leak path between the pressure-actuated member 144 and the spring engaging plate 162 at interfaces 165. The seals 163a are positioned as such to prevent fluid leakage through the leak path. An inner seal 163b can be arranged at the inner periphery between the spring engaging plate 162 and the second spline member 164. As previously described, the piston 140 remains rotationally stationary relative to the hub 160 in this embodiment, so the seals 163a do not endure a relative rotational motion. The spring engagement plate 162 can be fixed relative to the second spline member 164, such that the seal 163b does not endure relative movement during operation. When the seals 163a and 163b are internal to the clutch device 100 and are limited to such minimal (or no) sliding motion, the possibility of contaminants entering the chamber 180 through the seals 163a and 163b may be significantly reduced. Such a reduction in contamination may increase the longevity the clutch device 100 and may reduce the need for repair or replacement.

Referring again to FIGS. 1-3, the piston 140 in this embodiment serves as both the component that shifts to engage the input portion 110 (via the input ring 112) and the component that receives an output instrument (such as the fan blade device 20 depicted in FIG. 1). The output instrument mounted to the studs 23 of the piston 140 may also be shifted in the axial direction as the piston 140 is actuated, but the displacement in the axial direction may be relatively small such that this shifting motion has little or no impact on the output instrument. Similarly, the displacement in the axial direction may be relatively small such that the shifting motion of the piston 140 relative to the hub 160 has little or no impact on the longevity and performance of the seals 163a.

In some embodiments, the clutch device 100 can be readily removed from the drive pulley 30 without requiring disassembly of the input portion 100 from the output portion 130. For example, the clutch device 100 is mounted to the drive pulley 30 by the mounting bolts 32. Upon removal of the bolts 32 from the drive pulley 30, the and subsequent removal of the clutch device 100 from the drive pulley 30, the internal spring 170 is not permitted to freely expand and thereby cause disassembly of the clutch device 100 (e.g., the spring 170 is not permitted to unexpectedly expand and separate the piston 140 and hub 160 when a user attempts to remove the clutch device 100 from the drive pulley 30). Instead, the components of the clutch device 100, such as the input portion 110, the piston 140, the hub 160, and the spring 170, remain in the assembled state during the process of removal from the drive pulley 30.

To disassemble components of the clutch device 100 (e.g., for purposes of replacing the friction ring 132 or other repairs), the lock nut 116 can be removed from the second spline member 164. Once the lock nut 116 is removed, the bearings 114 and the input ring 112 can be removed. As previously described, the piston 140 includes the mounting plate 142 and the spring-engaging member 146 that are assembled together using the assembly bolts 145. To disassemble the piston 140 (e.g., separate the pressure actuated member 146 from the mounting plate 142), the bolts 145 can be removed. In this way, the clutch device 100 can be disassembled at another time (e.g., after the clutch device 100 is transported to a work bench or other area). As described in more detail below, the clutch device 100 can include the shut-off system that causes the fan blade device 20 to continuously rotate with the input portion so as to indicate to a vehicle operator that the friction ring 132 has worn below a threshold thickness. In such embodiments, the need for routine disassembly of the clutch device merely for visual inspection of the clutch ring can be reduced or eliminated, thereby reducing the down-time in which the vehicle is not in use due to service.

Figure 4:
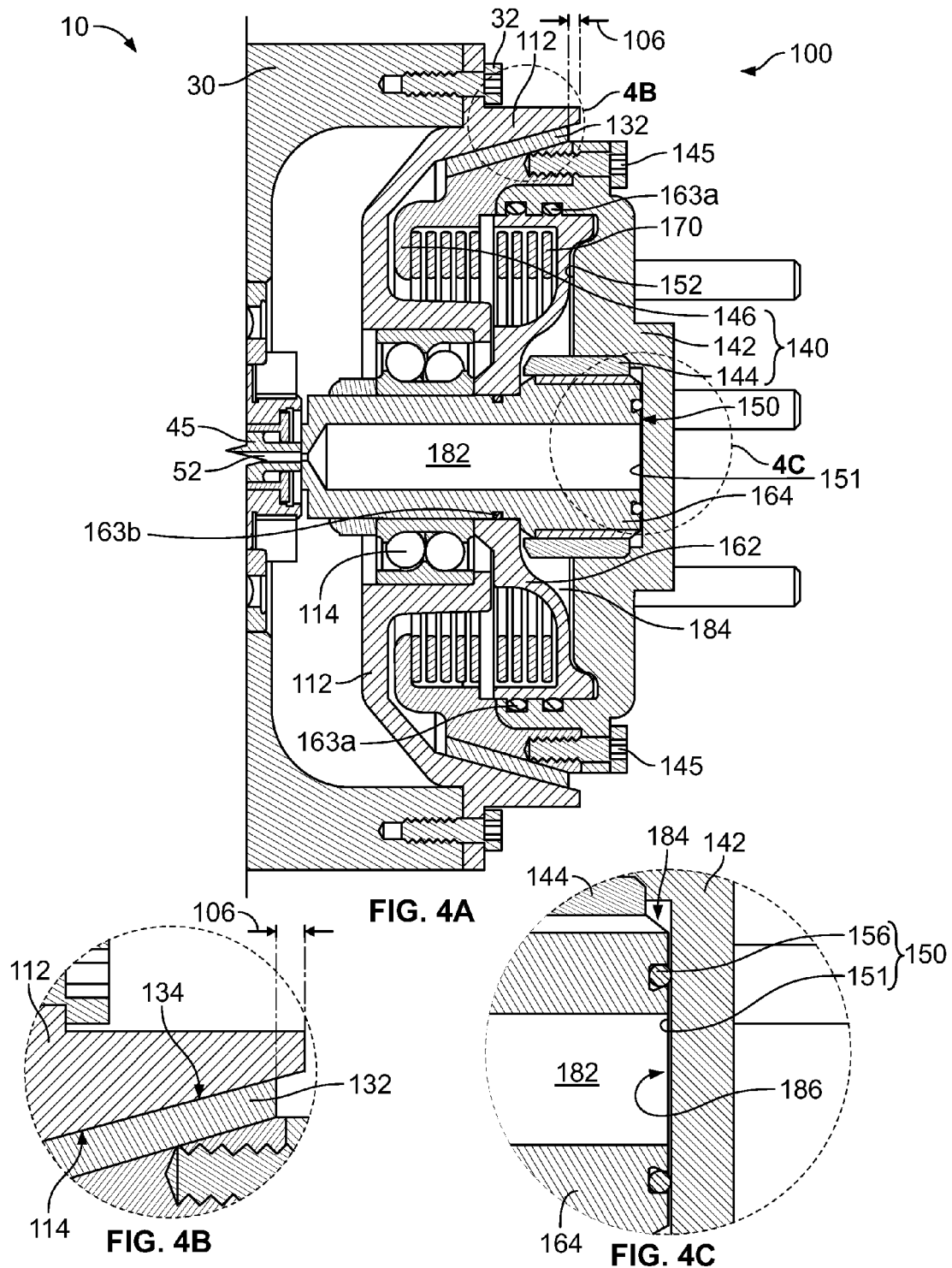
FIG. 4A is a cross-sectional view of the system of FIG. 1, including the fan clutch device having worn friction material, in accordance with some embodiments.
FIGS. 4B-4C are cross-sectional views of portions of the fan clutch device of FIG. 4A.

Referring now to FIGS. 4A-4C, after an extended period of use of the clutch device 100 (e.g., repeated transitions of the friction ring 132 between the disengaged and engaged positions), one or both of the engagement surfaces 114 and 134 can wear causing the piston 140 to travel farther axially toward the pulley 30 before the surfaces 114 and 134 engage (identified by a wear displacement 106 in FIG. 4A). In particular embodiments, the engagement surface 134 of the friction ring 132 will wear down such that the friction ring thickness is reduced below a threshold thickness level, which indicates that replacement of the friction ring 132 is required. In one example, the friction ring 132 can comprise a material that wears at a rate greater than does the input ring 112. As such, the friction ring 132 may be replaced after a period of use when the friction ring thickness wears below a predetermined level. The clutch device 100 can be configured to impart continuous friction engagement between the friction ring 132 and the opposing surface 114 of the input portion 110 in response to the friction ring 132 wearing down below a threshold thickness. In particular embodiments, the clutch device 100 is operable to prevent movement of the friction ring 132 from the engaged position to the disengaged position in response to the friction ring 132 wearing down below the threshold thickness.

For example, as seen in FIG. 4A-4C, as clutch material is worn from the friction ring 132, the piston 140 will travel farther axially in the direction of the pulley, before the engagement surfaces 114 and 134 frictionally engage and cause the output portion 130 to rotate with the input portion 110. After a selected amount of the material has worn away from the friction ring 132 resulting in the predetermined wear displacement 106, the thickness of the friction ring 132 then reaches a level below a predetermined threshold thickness. When the friction ring 132 is worn below the threshold thickness, the clutch shut-off system 150 is self-activated, without any user intervention or external controls, to prevent disengagement at the friction surfaces 114 and 134 between the input portion 110 and the output portion 130 of the clutch device 100.

Referring to FIGS. 4A and 4C, in some embodiments of the clutch shut-off system 150 is entirely housed in the output portion 130 and comprises at least two elements. In this embodiment, the two components of the clutch shut-off system 150 comprise a seal member 156 and the interior surface 151 of the plate 142, which at least partially defines a fluid-receiving space to receive the pressurized fluid. The seal member 156 can be arranged at an axial spacing from the interior surface 151 (refer to FIG. 2A) when the friction ring 132 has a thickness greater than the threshold thickness. The seal member 156 engages the interior surface 151 (refer to FIGS. 4A and 4C) to form a fluid seal only when the friction ring 132 is worn down below the threshold thickness. In the depicted example, an axial-facing portion of the seal member 156 abuts with the interior surface 151 (which is an axial surface that opposes the seal member 156) when the friction ring 132 is worn down below the threshold thickness. When the seal member 156 sealingly engages the interior surface 151, an exposed surface area of the fluid-receiving chamber 180 that is exposed to pressurized fluid is substantially reduced (e.g., only the circular area inside the diameter of the seal member 151 rather than both surfaces 151 and 152). Such a reduction in the exposed surface area of the fluid-receiving chamber 180 reduces the amount of force provided by the pressurized fluid, which in this embodiment prevents the fluid pressure force from overcoming the spring 170. Accordingly, the clutch shut-off system 150 prevents movement of the friction ring 132 to the disengaged position in response to the friction ring 132 wearing down below the threshold thickness, and does so without user intervention or external controls.

Figure 5:
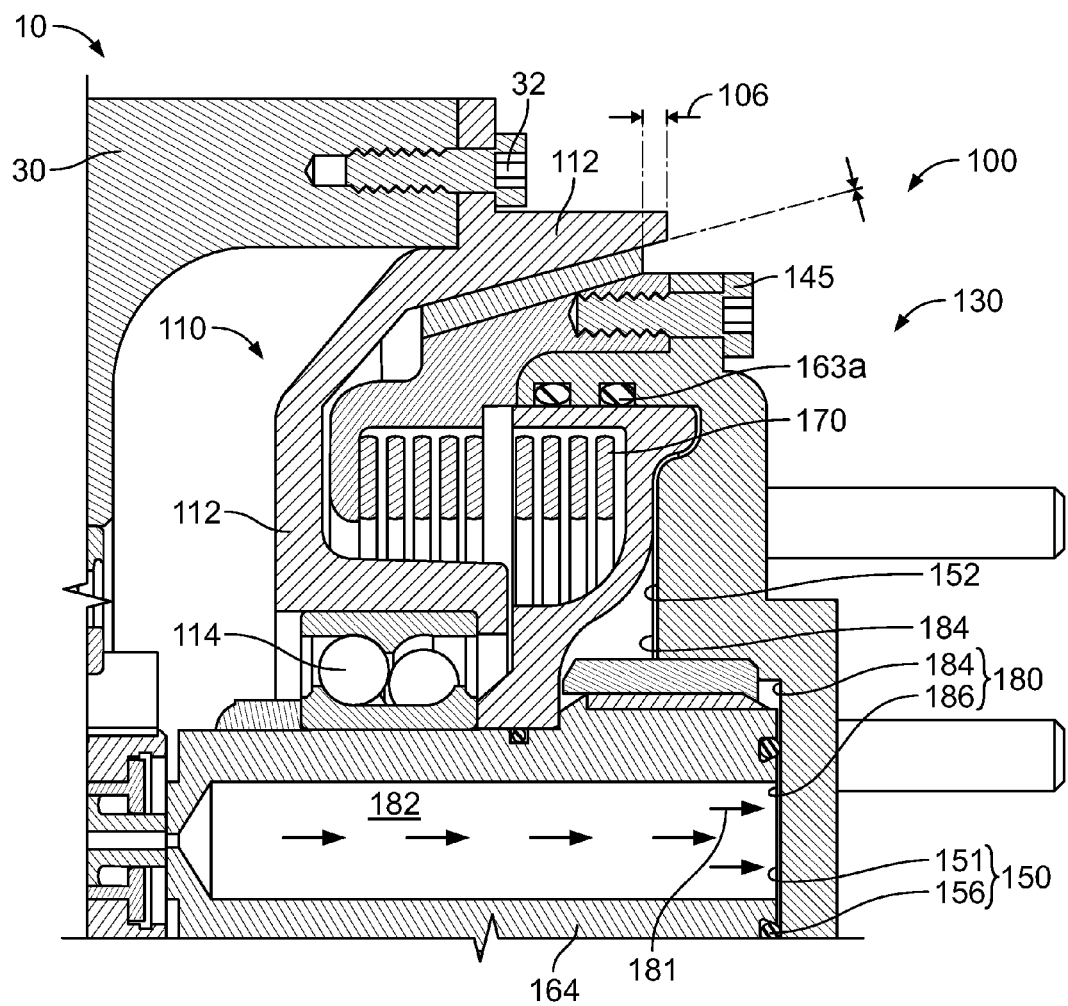
FIG. 5 is a cross-sectional view of the system of FIG. 4A with the output portion locked in an engaged position.

Referring now to FIGS. 4C and 5, the seal member 156 of the clutch shut-off system 150 may be positioned in a groove on a front face of the second spline member 164. The seal member 156 can be configured such a portion of the seal member protrudes axially forward from the groove so as to engage with the interior surface when the piston 140 is required to travel the displacement distance 106 (after the friction ring 132 is worn below the threshold thickness). In this embodiment, the second spline member 164 and the plate 142 of the piston portion 140 rotate together, so the seal member 156 is not exposed to relative rotational motion when it engages with the interior surface. When the seal member 156 form a seal engagement with the interior surface 151, the fluid-receiving chamber 180 (see FIG. 2A) may not be in fluid communication with the fluid channel 182 and the fluid reservoir (not shown). For example, an outer portion 184 of the fluid chamber 180 that is radially more distant from the central axis 35 than the seal member 156 may be sealed from an inner portion 186 (see FIG. 3). In particular, the area of the plate 142 that is inside the diameter of the seal member 156 can be exposed to the pressurized fluid, but the portion of the plate 142 (e.g., along the other interior surface 152) that is radially outward from the seal member 156 will not be exposed to the pressurized fluid. Thus, the amount of force provided by the pressurized fluid in the fluid-receiving space of the clutch device 100 is substantially reduced when the seal member 156 forms a seal against the interior surface 151, thereby preventing the force from the pressurized fluid from overcoming the bias force of the spring 170. In such circumstances, the friction ring 132 is continuously maintained in the engaged position both when the pressurized fluid is input into the clutch device 100 and when the pressurized fluid is withdrawn from the clutch device 100. In the configuration depicted in FIG. 4A-4C, the clutch device 100 can continue to operate the fan blade device 20 such that the fan blades 22 will continuously rotate with the input portion 110, providing a indication to the vehicle operator that the fan clutch device 100 requires service (e.g., to replace the friction ring 132).

As shown in the example in FIG. 5, the clutch device 100 in this embodiment is restricted from transitioning the friction ring 132 to the disengaged position (FIG. 3) because the clutch shut-off system 150 self-activated in response to the friction ring wearing down below a threshold thickness. In this example, the friction ring 132 has worn below predetermined level, so the interior surface 151 of the mounting plate 142 contacts with the seal member 156, which in this embodiment comprises an o-ring seal partially protruding from the front axial face of the second spline member 164. When in abutment with the interior surface 151, the seal member 156 fluidly isolates the outer portion 184 of the chamber 180 from the fluid channel 182. In this position, when fluid pressure is applied through the fluid channel 182, the pressurized fluid acts upon only the inner portion 186 of the chamber 180 (e.g., the circular area of the interior surface 151 that is inside the diameter of the seal member 156). However, the seal member 156 blocks the pressurized fluid from acting upon the outer portion 184 of the chamber 180 (e.g., the portion that is radially outward of the seal member 156). As such, the pressurized fluid is only able to exert pressure on a smaller area of the piston portion 140 (e.g., the circular area inside the diameter of the seal member 156 as shown in FIG. 5) as compared to the larger exposed area of the piston portion 140 (along both surfaces 151 and 152 as shown in FIG. 3) when the clutch shut-off system 150 is not activated.

Because the clutch shut-off system 150 in this embodiment limits the amount of exposed area for the pressurized fluid, a smaller axial force is imparted from the pressurized fluid to the piston portion 140 (refer to FIG. 5) than in the configuration where the fluid can access the entire chamber 180 (refer to FIG. 3). In this embodiment, the force imparted by the pressurized fluid on the smaller area 186 is not great enough to overcome the force bias of the spring 170. As such, even when fluid pressure is applied to disengage the clutch device 100, the clutch shut-off system 150 prevents the clutch device 100 from responding such that the friction ring does not transition away from the engaged position to the disengaged position.

In some embodiments, the clutch device 100 can be configured such that a user can become aware that the friction ring 132 has worn below the threshold thickness level without the need for a visual inspection. For example, in the embodiment previously described in connection with FIG. 5, the clutch device 100 will no longer transition the friction ring 132 from the engaged to the disengaged position. Thus, the clutch device 100 remains in the engaged position, causing the output portion 130 to remain rotationally coupled to the input portion 110. In this condition, the cooling fan device 20 will continuously rotate with the input portion 110, which serves as a notification to the vehicles operator or another user that the clutch device 100 is ready for service. Advantageously, however, even when the friction ring 132 of the clutch device 100 is worn down below the threshold level, the fan device 20 will continue to cause a cooling flow of air allowing the vehicle's engine and radiator. Thus, the vehicle operator can continue to operate the vehicle without fear of overheating and without the need to immediately cease vehicle operation to apply "come home" bolts or other intervention to the clutch device 100. When it is convenient for the vehicle operator, the vehicle can be taken to a service station for inspection of the clutch device 100, replacement of the friction ring 132, and the like.

It should be understood from the description herein that the drive member may have a configuration other than the drive pulley 30 shown. For example, the drive member may be a shaft or gear that is urged to rotate by the engine (via a direct or indirect coupling). In such embodiments, the input ring 112 or other component of the input portion 110 can have a mounting configuration to removably attach to that particular drive source or may have an adapter member connected therebetween.

In yet another embodiment, the friction ring 132 may be mounted to the input ring 112 or to another component of the input portion 110. In these embodiments, the opposing friction surface may be arranged on a portion of the piston 140 (e.g., the spring-engaging member 146, the mounting plate 142, and the like) or otherwise coupled to the output portion 130. As such, the piston 140 can be actuated to cause the friction ring 132 to be selectively engaged or disengaged with the opposing friction surface.

A number of embodiments of the invention have been described. Nevertheless, it will be understood that various modifications may be made without departing from the spirit and scope of the invention. Accordingly, other embodiments are within the scope of the following claims.

What is claimed is:

1. A fan clutch device to be removably mounted to a drive pulley, the fan clutch device comprising:
   an input portion that rotates with a drive pulley when the fan clutch device is mounted to the drive pulley;
   an output portion for receiving a fan blade device and having a friction ring that reciprocates in an axial direction relative to the input portion between an engaged position in which the friction ring frictionally engages with an opposing surface of the input portion to drive the output portion to rotate with the input portion and a disengaged position in which the friction ring is spaced apart from the opposing surface of the input portion; and
   a self-activating, clutch shut-off system that causes continuous friction engagement between the friction ring and the opposing surface of the input portion in response to the friction ring wearing down below a threshold thickness.

2. The device of claim 1, wherein the self-activating, clutch shut-off system prevents movement of the friction ring from the engaged position to the disengaged position in response to the friction ring wearing down below the threshold thickness.

3. The device of claim 2, wherein the self-activating, clutch shut-off system is housed in the output portion and comprises at least two elements.

4. The device of claim 3, wherein the clutch shut-off system is self-activating in that the two elements engage one another only when the friction ring is worn down below the threshold thickness, wherein the friction ring is prevented from moving from the engaged position to the disengaged position when the two elements engage one another.

5. The device of claim 4, wherein the two components of the self-activating, clutch shut-off system comprise a seal member and an interior surface of a fluid-receiving space, wherein the seal member engages the interior surface of the fluid-receiving space to form a fluid seal only when the friction ring is worn down below the threshold thickness.

6. The device of claim 5, wherein when the seal member sealingly engages the interior surface of the fluid-receiving space, a surface area of the fluid-receiving space that is exposed to pressurized fluid is substantially reduced, thereby preventing the pressurized fluid in the fluid-receiving space from causing the friction ring to move from the engaged position to the disengaged position.

7. The device of claim 1, wherein the self-activating, clutch shut-off system prevents movement of the friction ring to the disengaged position in response to the friction ring wearing down below the threshold thickness and without external controls.

8. The device of claim 1, wherein the output portion comprises:
   a hub portion that, when the fan clutch device is mounted to the drive pulley, is selectively movable relative to the drive pulley; and
   a piston portion adjustable in the axial direction relative to the drive pulley when the fan clutch device is mounted to the drive pulley, the piston portion being axially adjustable so as to shift the friction ring between the engaged position and the disengaged position;
   a fluid-receiving space being at least partially defined by a surface of the piston portion, the fluid-receiving space being configured to receive pressurized fluid to urge the friction ring to the disengaged position; and
   at least one spring device to that biases the friction ring to the engaged position.

9. The device of claim 8, wherein the friction ring is a frusto-conical clutch ring that is arranged radially outward of the output portion.

10. A fan clutch system, comprising:
    a drive pulley that rotates about a rotational axis;
    a clutch device removably mounted to the drive pulley, the clutch device comprising:
       an input portion that rotates with a drive pulley;
       an output portion having a friction ring that reciprocates in an axial direction relative to the input portion between an engaged position in which the friction ring frictionally engages with an opposing surface of the input portion to drive the output portion to rotate with the input portion and a disengaged position in which the friction ring is spaced apart from the opposing surface of the input portion; and an internal mechanical shut-off system that is housed in the output portion and that is automatically activated, in response to the friction ring wearing down below a selected level, to prevent movement of the friction ring from the engaged position to the disengaged position;

a fan blade device mounted to the output portion of the clutch device so as to rotate when the friction ring is in the engaged position.

11. The system of claim 10, wherein the internal mechanical shut-off system causes continuous friction engagement between the friction ring and the opposing surface of the input portion in response to the friction ring wearing down below the selected level.

12. The system of claim 11, wherein the internal mechanical shut-off system comprises at least two elements, and the internal mechanical shut-off system is self-activating in that the two elements engage one another only when the friction ring is worn down below the selected level, wherein the friction ring is prevented from moving from the engaged position to the disengaged position when the two elements engage one another.

13. The system of claim 12, wherein the two components of the internal mechanical shut-off system comprise a seal member and a surface of a fluid-receiving space, wherein the seal member engages the surface of the fluid-receiving space to form a fluid seal only when the friction ring is worn down below the selected level, and wherein when the seal member sealingly engages the surface of the fluid-receiving space, a surface area of the fluid-receiving space that is exposed to pressurized fluid is substantially reduced such that the pressurized fluid in the fluid-receiving space is hindered from causing the friction ring to move from the engaged position to the disengaged position.

14. The system of claim 10, wherein the output portion of the clutch device comprises:

a hub portion that is selectively movable relative to the drive pulley; and a piston portion adjustable in the axial direction relative to the drive pulley so as to shift the friction ring between the engaged position and the disengaged position;

a fluid-receiving space being at least partially defined by a surface of the piston portion, the fluid-receiving space being configured to receive pressurized fluid to urge the friction ring to the disengaged position; and at least one spring device to that biases the friction ring to the engaged position.

15. The system of claim 14, wherein the friction ring is a frusto-conical clutch ring that is arranged radially outward of the output portion.

16. A method of operating a fan clutch device that is removably mounted to a drive pulley, the method comprising:

rotating an input portion of a fan clutch device with a drive pulley;

reciprocating a friction ring of an output portion of the fan clutch device in an axial direction between an engaged position and a disengaged position, wherein when the friction ring is in the engaged position, the friction ring frictionally engages with an opposing surface of the input portion to drive the output portion to rotate with the input portion, and wherein when the friction ring is in the disengaged position, the friction ring is spaced apart from the opposing surface of the input portion; and in response to the friction ring wearing down below a threshold thickness, automatically shutting off the fan clutch device without user intervention while the friction ring is in the engaged position such that friction ring is hindered from moving to the disengaged position.

17. The method of claim 16, wherein the step of automatically shutting off the fan clutch device comprises causing an internal mechanical shut-off system to self-activate in response to the friction ring wearing down below the threshold thickness, wherein the internal mechanical shut-off system is housed within the output portion of the fan clutch device and causes continuous friction engagement between the friction ring and the opposing surface of the input portion in response to the friction ring wearing down below the threshold thickness.

18. The method of claim 17, wherein the step of automatically shutting off the fan clutch device comprises causing at least two elements of the internal mechanical shut-off system to engage one another only when the friction ring is worn down below the threshold thickness, wherein the friction ring is prevented from moving from the engaged position to the disengaged position when the two elements engage one another.

19. The method of claim 18, wherein the two components of the internal mechanical shut-off system comprise a seal member and a surface of a fluid-receiving space, wherein the seal member engages the surface of the fluid-receiving space to form a fluid seal only when the friction ring is worn down below the threshold thickness.

20. The method of claim 19, wherein when the seal member sealingly engages the surface of the fluid-receiving space, a surface area of the fluid-receiving space that is exposed to pressurized fluid is substantially reduced such that the pressurized fluid in the fluid-receiving space is hindered from causing the friction ring to move from the engaged position to the disengaged position.

* * * * *